(12) United States Patent
Levine et al.

(10) Patent No.: US 9,402,112 B1
(45) Date of Patent: Jul. 26, 2016

(54) TWO-STAGE PLAYBACK: VERIFYING USER INTENT TO WATCH AN EMBEDDED VIDEO

(71) Applicant: Google Inc., Mountain View, CA (US)

(72) Inventors: Jonathan Philip Levine, San Francisco, CA (US); Richard Benjamin Leider, San Francisco, CA (US); Michael Brandt, San Francisco, CA (US); Brian Palmer, San Mateo, CA (US); Shivakumar Littoo Rajaraman, San Francisco, CA (US); Andrew David Berkheimer, San Francisco, CA (US); Steven Kollars, Oakland, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/606,691

(22) Filed: Jan. 27, 2015

Related U.S. Application Data (60) Provisional application No. 61/932,190, filed on Jan. 27, 2014.

(51) Int. Cl.
| | |
|---|---|
| *H04N 21/81* | (2011.01) |
| *H04N 21/2547* | (2011.01) |
| *H04N 21/2668* | (2011.01) |
| *H04N 21/235* | (2011.01) |
| *H04N 21/472* | (2011.01) |
| *H04N 21/237* | (2011.01) |
| *H04N 21/2387* | (2011.01) |
| *H04N 21/4722* | (2011.01) |
| *H04N 21/435* | (2011.01) |

(52) U.S. Cl.
CPC ........... *H04N 21/812* (2013.01); *H04N 21/237* (2013.01); *H04N 21/2353* (2013.01); *H04N 21/2387* (2013.01); *H04N 21/2547* (2013.01); *H04N 21/2668* (2013.01); *H04N 21/435* (2013.01); *H04N 21/4722* (2013.01); *H04N 21/47217* (2013.01)

(58) Field of Classification Search
USPC ............................................... 725/13, 22, 23
See application file for complete search history.

(56) References Cited

PUBLICATIONS

Martonik, Andrew, Facebook testing auto-play video in the News Feed for some mobile users, Sep. 12, 2013, p. 2.*

* cited by examiner

*Primary Examiner* — Hunter B Lonsberry
(74) *Attorney, Agent, or Firm* — Lowenstein Sandler LLP (57) ABSTRACT

A method for facilitating monetization of an embedded video configured for automated playback includes detecting, via an iframe embedded in a user interface of a third party platform, an indication of a user intent to view the video configured for automated playback. The video is hosted by a content sharing platform and embedded in the user interface of the third party platform. The method further includes providing, to a client device, video related data pertaining to the automated playback of the video in the user interface of the third party platform, and upon receiving the video-related data, validating the automated playback of the video in the user interface of the third party platform.

17 Claims, 6 Drawing Sheets

TWO-STAGE PLAYBACK: VERIFYING USER INTENT TO WATCH AN EMBEDDED VIDEO

CROSS-REFERENCE TO RELATED APPLICATIONS

This application claims the benefit of U.S. Provisional Application No. 61/932,190, filed on Jan. 27, 2014, the content of which is incorporated herein by reference in its entirety.

BACKGROUND

On the Internet, video sharing platforms or services allow users to upload, view, and share content, such as video content, image content, audio content, and so on. The content may include content from professional content creators, e.g., movie clips, TV clips, and music videos, as well as content from amateur content creators, e.g., video blogging and short original videos.

A content sharing platform (CSP) may allow a third party service (e.g., a news service, a social network service, etc.) to embed a video hosted by the CSP on their web pages or application user interface (e.g., mobile app UIs) and may provide developers with an option to make a video start automatically ("autoplay"). When this happens, the CSP does not know whether a user actually wanted to watch a video or not, so the CSP cannot serve ads alongside the video (monetize it) or increment the video's view count.

In certain cases, a social network service or some other media portal may make up a large share of video views in a particular region or on a particular platform. If these services present embedded videos using an autoplay feature, then video creators may not get credit for their efforts because the CSP does not know whether users intended to watch these embedded videos or not since the users are not watching these videos on the CSP website or app. Furthermore, some videos may be blocked from playing in contexts where the video cannot be monetized.

One conventional approach of counting and monetizing videos embedded in third party content may involve forcing a user to click the video to start playback. However, this approach eliminates an autoplay feature desired by third party services. Another approach may involve adding a third party service to a whitelist to allow all of the autoplayed videos that are hosted by the CSP and appear on the third party website or app to be counted and monetized. However this approach can be easily abused.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

A method and system for facilitating monetization of an embedded video configured for automated playback includes detecting, via an iframe embedded in a user interface of a third party platform, an indication of a user intent to view the video configured for automated playback. The video is hosted by a content sharing platform and embedded in the user interface of the third party platform. The method further includes providing, to a client device, video related data pertaining to the automated playback of the video in the user interface of the third party platform, and upon receiving the video-related data, validating the automated playback of the video in the user interface of the third party platform.

In one implementation, a message is sent indicating that the automated playback of the video in the user interface of the third party service is authorized. In one implementation, upon validating the automated playback of the video in the user interface of the third party platform, a view count for the video is incremented, and in some implementations, one or more ads to be presented with the video are provided. In some implementations, validating the automated playback of the video in the user interface of the third party platform comprises determining, based on a timestamp of the video-related data, that the received video related data has not yet expired.

In one implementation, the video-related data pertaining to the automated playback of the video in the user interface of the third party platform is a token that is valid for a predefined period of time. The token may include one or more of a video identifier of the video, a third party platform service location identifier, a timestamp, or dimensions of a user interaction target area defined by the iframe.

In some implementations, a client device is disclosed that includes a memory, and a processing device, coupled to the memory, to present a user interface of a third party platform, the user interface having an embedded iframe to display a graphical representation of a video embedded in the user interface of the third party platform, the video configured for automated playback in the user interface of the third party platform. The processing device is further to provide, to a server, a request for video related data pertaining to the automated playback of the video in the user interface of the third party platform, receive, from the server, the video related data pertaining to the automated playback of the video in the user interface of the third party platform, and store the received video related data in local storage for subsequent validation to enable the automated playback of the video in the user interface of the third party platform.

In some implementations, prior to initiating the automated playback of the video in the user interface of the third party platform, the local storage is accessed to determine whether the local storage includes the video related data for the video, and responsive to determining that the local storage includes the video related data for the video, a request for video information data is sent to the server, the request including the video related data for the video.

In some implementations, a video information response is received from the server, the video information response indicating that the video related data is valid, and the automated playback of the video is initiated in the user interface of the third party platform. In some implementations, an ad is received for presentation with the video, and the ad is presented in the user interface of the third party platform.

In additional implementations, computing devices for performing the operations of the above described implementations are also implemented. Additionally, in implementations of the disclosure, a computer readable storage medium may store instructions for performing the operations of the implementations described herein.

BRIEF DESCRIPTION OF THE DRAWINGS

The present disclosure will be understood more fully from the detailed description give below and from the accompanying drawings of various implementations of the disclosure.

DESCRIPTION OF EMBODIMENTS

Aspects of the present disclosure provide a video playback approach that allows a content sharing platform (CSP) to count views of CSP videos that are embedded in content of third party platforms and are configured for automated playback (referred to as "autoplay"). A third party platform can refer to a service or application (other than the CSP) that provides users with various content (e.g., web pages or mobile app UIs) with embedded videos hosted by the CSP. Such a third party platform can represent, for example, a news service, a social network service, an online retailer, etc. Autoplay is a feature that allows a video to start playing automatically (without a user request) as soon as it is available for playback. For example, when a third party developer is embedding a video in particular content (e.g., a web page or mobile app UI), the third party developer can add an autoplay attribute to the video embed code to configure the video for automated playback.

As discussed above, conventional solutions generally do not provide an effective mechanism for counting views of such videos and/or for monetizing such videos. Aspects of the present disclosure address the above deficiencies by providing a two-stage playback approach in which a third party developer is provided with an option to embed, in third party content, an iframe to be served by the CSP. The iframe may contain a graphical representation (e.g., a thumbnail) of a video to be watched by a user. During the first stage, a user is presented with third party content (e.g., a search result UI) including a thumbnail of a video. If the user clicks on the thumbnail, it causes the CSP to generate video-related data (e.g., a secure token) and send it to a user device, which stores it in local storage. During the second stage, a playback of the video can be attempted by the video player, which causes the video player to send the secure token back to the CSP for validation. If the secure token is validated, the video player is instructed to start automatic playback of the video. The CSP can then process the playback as a view and optionally serve ads in the video player. In some implementations, the CSP can block playback if the two-stage token is invalid or not present.

By providing a user of a third party platform with an option to click on a graphical representation (e.g., a thumbnail) of a video, user intent to watch the video is verified in a scalable way without the need to whitelist the third party platform. In addition, if the CSP identifies the use of the above two-stage playback approach by the third party platform, the CSP is able to trust that views originating from the third party site are valid and can be counted and monetized. Accordingly, aspects of the present disclosure provide an effective mechanism for counting views of videos embedded in third party content and monetizing such videos.

The present disclosure often references videos for simplicity and brevity. However, the teaching of the present disclosure are applied to media item instances generally and can be applied to various types of content or media item instances, including for example, video, audio, text, images, program instructions, etc.

Figure 1:
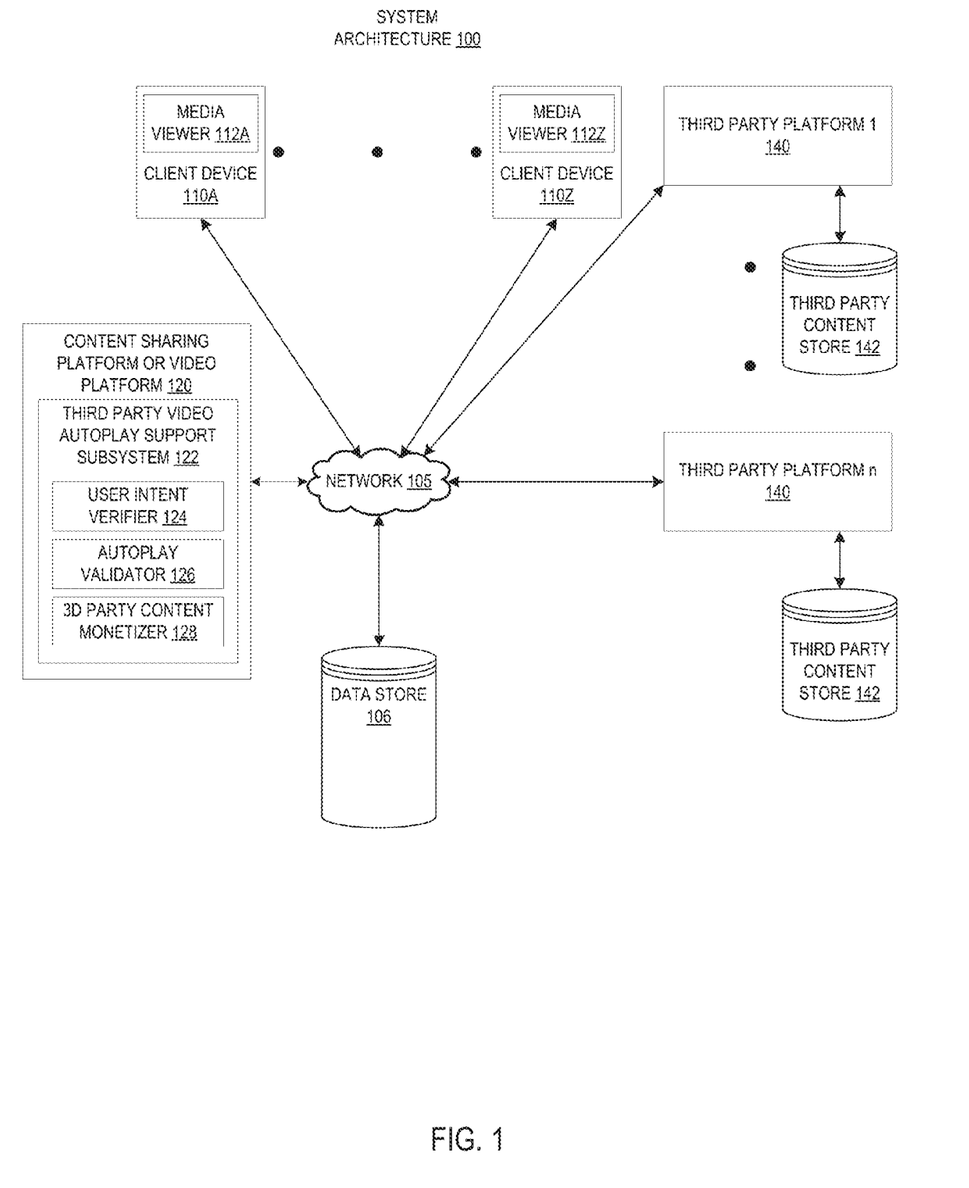
FIG. 1 illustrates an example system architecture, in accordance with some implementations of the present disclosure

FIG. 1 illustrates example system architecture 100, in accordance with one implementation of the present disclosure. The system architecture 100 includes one or more client devices 110A through 110Z, one or more networks 105, one or more playlist data stores 107, one or more media item data stores 106, a content sharing platform (e.g., a video platform) 120, and one or more third party platforms 140. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the media item data store 106 or the playlist data store 107 may be a memory (e.g., random access memory), a cache, a drive (e.g., a hard drive), a flash drive, a database system, or another type of component or device capable of storing data. The media item data store 106 or the playlist data store 107 may also include multiple storage components (e.g., multiple drives or multiple databases) that may also span multiple computing devices (e.g., multiple server computers).

The client devices 110A-Z can include devices, such as, cellular telephones, personal digital assistants (PDAs), portable media players, netbooks, laptop computers, electronic book readers, tablet computers, desktop computers, set-top boxes, gaming consoles, televisions, and the like. The individual client devices 110A-Z can include media viewers 112A-. In one implementation, the media viewers 112A-Z are applications that allow users to view content, such as images, videos, documents (e.g., web pages), etc. For example, the media viewer 112A-Z may be a web browser that can access, retrieve, present, and/or navigate content (e.g., web pages such as Hyper Text Markup Language (HTML) pages, digital media items, etc.) served by a web server. The media viewer 112A-Z can render, display, and/or present the media item content (e.g., a web page, a media viewer) to a user. The media viewer 112-Z may also display an embedded media player (e.g., a Flash® player or an HTML5 player) that is embedded in a document (e.g., a web page). In another example, the media viewers 112A-Z may be standalone applications (e.g., mobile applications, desktop applications, gaming consoles applications, television applications, etc.) that allow users to view digital media items (e.g., digital videos, digital images, electronic books, etc.). The media viewers 112A-Z can be provided to client devices 110A through 110Z by the content sharing platform 120. For example, the media viewers 112A-Z may be embedded media players that are embedded in documents (e.g., web pages) provided by the content sharing platform 120. In another example, the media viewers 112A-Z may be standalone applications that are pre-installed on the client devices 110A through 110Z.

The content sharing platform 120 can include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, edit, recommend, share, rate, and/or comment on media items. The content sharing platform 120 can provide a website (e.g., one or more webpages) and/or one or more applications that may be used to provide a user with access to the media items.

The content sharing platform 120 may provide media items to third party platforms 140 or client devices 110A-Z. Examples of a media item can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A media item may be consumed via the Internet and/or via a mobile device application. For brevity and simplicity, an online video (also hereinafter referred to as a video) is used as an example of a media item throughout this document. As used herein, "media," "media item," "online media item," "digital media," and a "digital media item" can include an electronic file that can be executed or loaded using software, firmware or hardware configured to present the digital media item to an entity.

In one aspect, media item data store 106 comprises media item content files such as video (.MP3, .AVI, .MPG, .WMV, .MOV, or the like), audio (.MP3, .WAV, or the like), or image (.TIF, .JPG, .PNG, .GIF, or the like). The media item data store 106 provides the content sharing platform 120 with media content necessary to fill user requests. The media item data store 106 may also include user information, preference, settings, or other information ancillary to proving media item content to the content sharing platform 120. Media item data store 106 is communicatively coupled to the content sharing platform 120 over the network 105.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

The third party platform 140 may be one or more computing devices (e.g., servers), data stores, networks, software components, and/or hardware components that may be used to allow users to connect to, share information, and/or interact with each other. The third party platform 140 can be, for example, a news service, an online retailer, an online reservation service, a social network, or any other service or application that can present content with embedded videos to users, and optionally receive user requests to search for specific content items, and present search results in a third party platform UI. The third party platform 140 may allow third party developers to embed CSP videos stored in data store 106 into third party content stored in third party content store 142.

In one implementation, the content sharing platform 120 may be integrated with the third party platform 140. For example, the third party platform 140 may use the content sharing platform 120 to allow users to upload and/or share content. In another implementation, the third party platform 140 may be separate from the content sharing platform 120. In one implementation, the third party platform 140 can be a mobile platform to allow users to receive and search content, connect to, share information, and/or interact with each other using one or more mobile devices, smart phones, tablet devices, and other mobile communication devices that allow users to communicate over a telecommunications network. For example, the mobile platform may enable telephony communication, Short Message Service (SMS) messaging, Multimedia Message Service (MMS) messaging, text chat, and video chat between users.

In situations in which the systems discussed herein collect personal information about users, or may make use of personal information, the users may be provided with an opportunity to control whether the content sharing platform 120 can collect user information (e.g., information about a user's social network, social actions or activities, profession, a user's preferences, or a user's current location), or to control whether and/or how to receive content from a content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

In some implementations, the content sharing platform 120 may comprise a third party video autoplay support subsystem 122. The subsystem 122 can provide an application programming interface (API) that allows a third party developer to embed a video in third party content and configure the video for automatic playback. In some implementations, the subsystem 122 can provide an iframe API script for third party content to enable a thumbnail functionality on the third party content (e.g., a web page or a mobile app UI). For example, the "thumbnail" CSS class and a "data-videoid" attribute can be added to a specific DOM element of a web page or a UI document to cause it to be transformed into a thumbnail when the iframe API loads. User click events can be captured via the methods provided by the iframe API. An iframe embedded on the third party content may include parameters such as a video ID and the third party service URL.

The subsystem 122 can include a user intent verifier 124 that detects an indication of user intent to view a video. Such an indication is detected when a user is presented, on client device 110, with third party content (e.g., search results) in a UI with an embedded iframe presenting a thumbnail of a video, and the user selects (e.g., clicks) the thumbnail. In response to the user selection, a request for video-related data pertaining to automated video playback (e.g., a request for an autoplay token) is generated and sent by client device 110 to CSP 120. For example, the embedded iframe may include an on-click handler that issues a server request for an autoplay token. Upon receiving a request for an autoplay token, the user input verifier 124 creates an autoplay token for a video associated with the thumbnail. An autoplay token can be valid for a predefined time period. In some implementations, an autoplay token may be an encrypted token that includes, for example, a video id, a third party platform URL or developer key, a timestamp, and dimensions (width, height) of a user interaction target area (e.g., click target area) defined by the iframe. The user interaction target area may correspond to the thumbnail. Alternatively, the user interaction target area may extend beyond the thumbnail, e.g., it may include the title, summary and/or logo in addition to the thumbnail. Yet alternatively, user clicks may be verified using the title, summary or logo served by the CSS, and video thumbnails may not be included in the iframe. Still alternatively, the user intent can be verified using a mechanism other than a click. For example, a certain user interaction(s) may be designated as an indication of user intent to play a video, and user interactions on the embedding website may be monitored to detect a designated interaction(s).

The user input verifier 124 sends the generated autoplay token to client device 110 of the user. Client device 110 stores the generated autoplay token in local storage (HTML5 local storage) on client device 110 (e.g., in the context of the CSP identifier such as a CSP URL). Alternatively, the token can be stored in a different format or using a different storage mechanism. For example, for third parties that embed CSP videos in mobile app UIs, the CSP can provide an API for storing a token, or can require developers to use a designated browser component to serve the thumbnail and store the token, and then communicate the click to the external app (e.g., using a JavaScript to Objective-C bridge technique). Yet alternatively, the CSP can store the token on the CSP server and verify that a user who clicked on a thumbnail has a valid cookie.

In some implementations, in addition to generating the autoplay token, the user intent verifier 124 can also send a message to the third party platform 140 to indicate that a click or some other designated user interaction was detected. The third party platform 140 can then display/redirect the user to a video player that should autoplay the video. The video player, upon receiving an autoplay instruction, can check the local storage to see if there is an autoplay token present for a video identifier of the video. If so, the video player can send the autoplay token to the CSP 120. In some implementations, the video player sends the autoplay token in its video information request and/or any of its video statistics pings.

The subsystem 122 includes an autoplay validator 126 that validates the autoplay token provided by the video player and returns an indication (e.g., a flag returned with the video information response) that the video can be autoplayed. In some implementations, the autoplay validator 126 can verify the signature, decrypt the autoplay token, and validate the parameters of the autoplay token. For example, the autoplay validator 126 can determine whether the video identifier in the autoplay token matches a video identifier of a video requested to be autoplayed, determine whether the autoplay token is still valid time wise (e.g., whether the timestamp of the autoplay token is sufficiently "young" such as within a predefined time of issuance), and determine whether the size of the user interaction target area is sufficiently large (e.g., exceeds a minimum size threshold).

Alternatively, the autoplay token can be sent back to the CSP in a different format, or be verified in a different way or at a different time. The autoplay token may also be scoped to an entire webpage or mobile app UI document, not just a video.

The subsystem 122 can also include a third party content monetizer 128 that can count views of videos embedded in third party content including videos configured for autoplay, and facilitate monetization of such videos such as providing ads for presentation with such videos. In some implementations, the third party content monetizer 128 maintains a viewcount pipeline in which autoplayed videos are marked to be discounted as views. If the autoplay validator 126 determines that the autoplay token is valid, the third party monetizer 128 overrides autoplay-discounting for the video associated with the autoplay token in the viewcount pipeline. If the validation fails, the autoplayed video can be marked as spam. In the absence of a signal that the autoplay token is not valid, the autoplayed video is marked as a view.

Figure 2:
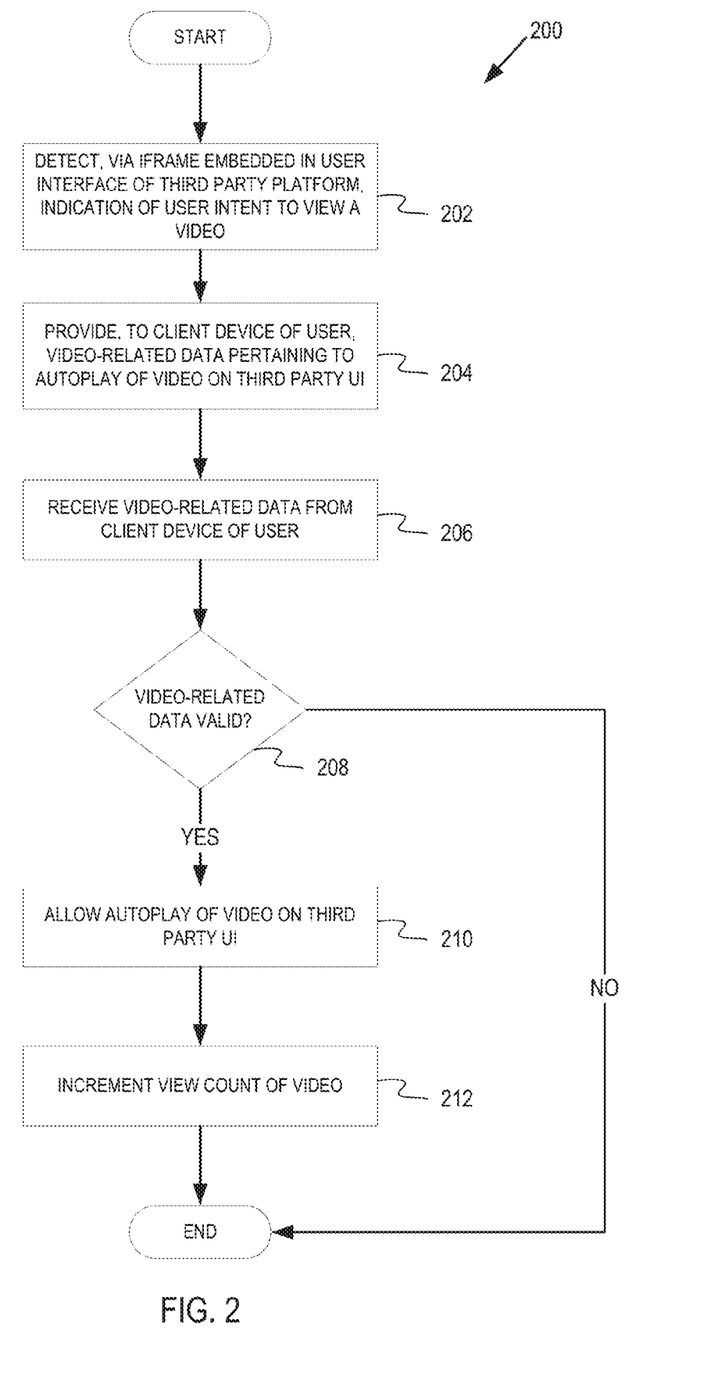
FIG. 2 is a flow diagram of a server-side method for facilitating monetization of videos embedded in third party content, in accordance with some aspects of the present disclosure.

FIG. 2 is a flow diagram of a server-side method for facilitating monetization of autoplayed videos embedded in third party content, in accordance with various aspects of the present disclosure. The method may be performed by processing logic that comprises hardware (e.g., circuitry, dedicated logic, programmable logic, microcode, etc.), software (e.g., instructions run on a processing device to perform hardware simulation), or a combination thereof. For example, the method may be performed by the content-sharing platform 120 of FIG. 1.

For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program, including a set of instructions, accessible from any non-transitory, tangible computer-readable device or storage medium.

Referring to FIG. 2, at block 202, a server detects an indication of user intent to a view a video embedded in a third party UI. As discussed above, the indication can be detected when a user is presented with third party content (e.g., search results) in a UI with an embedded iframe presenting a thumbnail of the video, and the user selects (e.g., clicks) the thumbnail, which causes a request for video-related data pertaining to automated video playback to be generated and sent to the server.

At block 204, the server receives the above request, creates the video-related data, and sends, to a client device of the user, the video related data pertaining to autoplay of the video in the third party UI. In some implementations, such video related data can be in the form of an autoplay token, which can be valid for a predefined time period, and can be an encrypted token that includes, for example, a video id, a third party platform URL or developer key, a timestamp, and dimensions (width, height) of a user interaction target area defined by the iframe. In some implementations, in addition to providing the autoplay token, the server can also send a message to the third party platform to indicate that a click or some other designated user interaction was detected. The third party platform can then display/redirect the user to a video player to autoplay the video. The video player, when it receives an autoplay instruction, can check local storage to see if there is video-related data (such as an autoplay token) present for a video identifier of the video. If so, the video player can send the video related data to the server.

At block 206, the server receives the video related data from the client device, and determines whether the video related data is valid. In some implementations, the server can verify the signature associated with the video related data, decrypt the video related data, and validate its parameters. For example, the server can determine whether the video identifier in the video related data such as an autoplay token matches a video identifier of a video requested to be autoplayed, determine whether the video related data is still valid time wise (e.g., whether its timestamp is sufficiently "young"), and determine whether the size of the user interaction target area is sufficiently large (e.g., exceeds a minimum size threshold).

If the server determines that the video related data is valid (block 208), the server allows autoplay of the video in the third party UI (block 210), and increments a view count of the autoplayed video (block 212). If the server determines that the video related data is invalid, the server may not allow autoplay of the video, or may allow autoplay of the video but may refrain from incrementing a view count of the autoplayed video.

Figure 3:
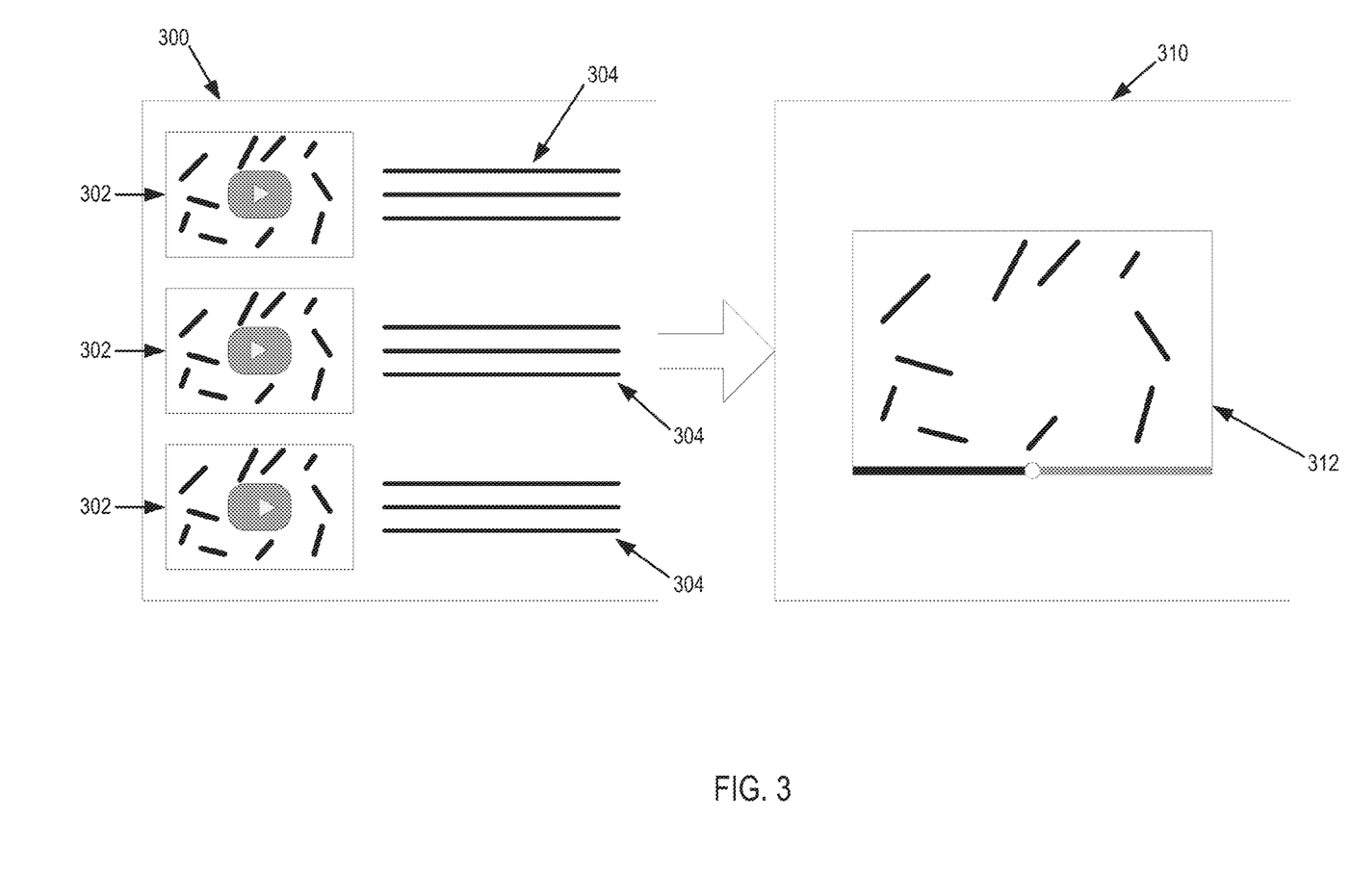
FIG. 3 illustrates operation of a two-stage approach for facilitating an automatic playback of an embedded video in a user interface provided by a third party platform, in accordance with some implementations of the disclosure.

FIG. 3 illustrates operation of a two-stage approach for facilitating an automatic playback of an embedded video in a user interface provided by a third party platform, in accordance with some implementations of the disclosure.

Referring to FIG. 3, a sample GUI 300 displays third party content (e.g., search results 304) with thumbnail images 302 of videos. GUI 300 is provided by a third party platform and includes an embedded iframe that causes a thumbnail image of a video to be displayed in the GUI 300. For each video, only a thumbnail image of the video is loaded, not the video player. The video is hosted by the CSP, and the iframe is provided by the CSP and is able to trigger data exchange with the CSP. In particular, if the user interacts with any of the thumbnail images 302 (e.g., by clicking on, tapping on, or moving the cursor to the thumbnail image 302), a request for an autoplay token is issued to the CSP.

In response to the above request, the CSP generates an autoplay token for a video associated with the thumbnail image 302 and sends it to the user's device. As discussed above, the autoplay token, which can be valid only for a limited time, can then be stored in local storage of the user's device.

A subsequent attempt of the video player 312 in GUI 310 to start automatic playback of the video involves obtaining, by the video player 312, an autoplay token associated with the video from the local storage, and sending the autoplay token to the CSP for validation. If validation is successful, the video is provided to the video player with an autoplay instruction, and a view count of the autoplayed video is incremented (e.g., after receiving an indication from the video player that the playback of the video or a portion of the video has completed). GUI 310 shows the video player 312 playing the video provided by the CSP. One or more ads can be also sent to the user's device for presentation with the video (e.g., in parallel with the video, after a portion of the video, at the end of the video, etc.).

Figure 4:
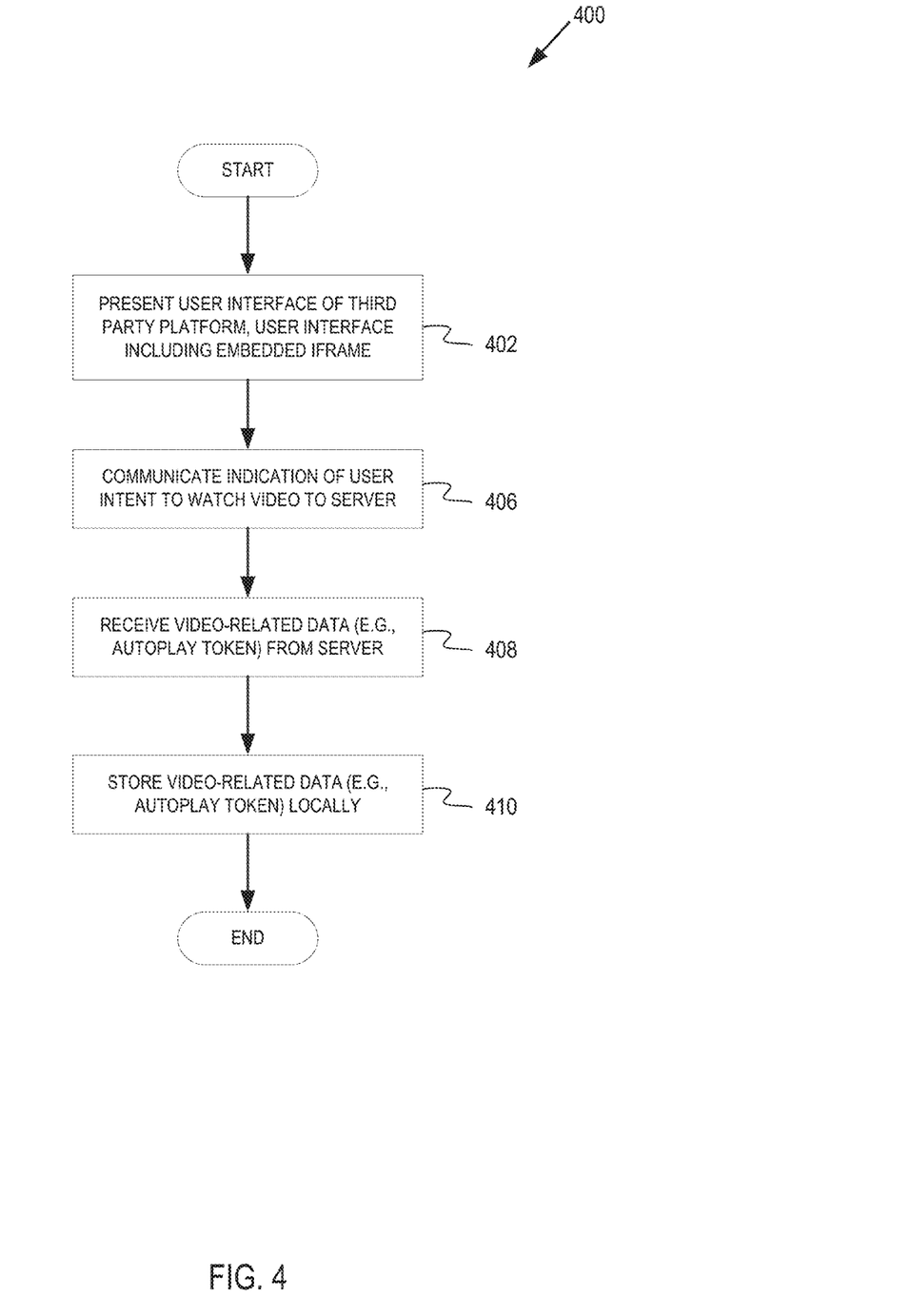
FIG. 4 is a flow diagram of a client-side method for facilitating monetization of videos embedded in third party content, in accordance with some aspects of the present disclosure.
Figure 5:
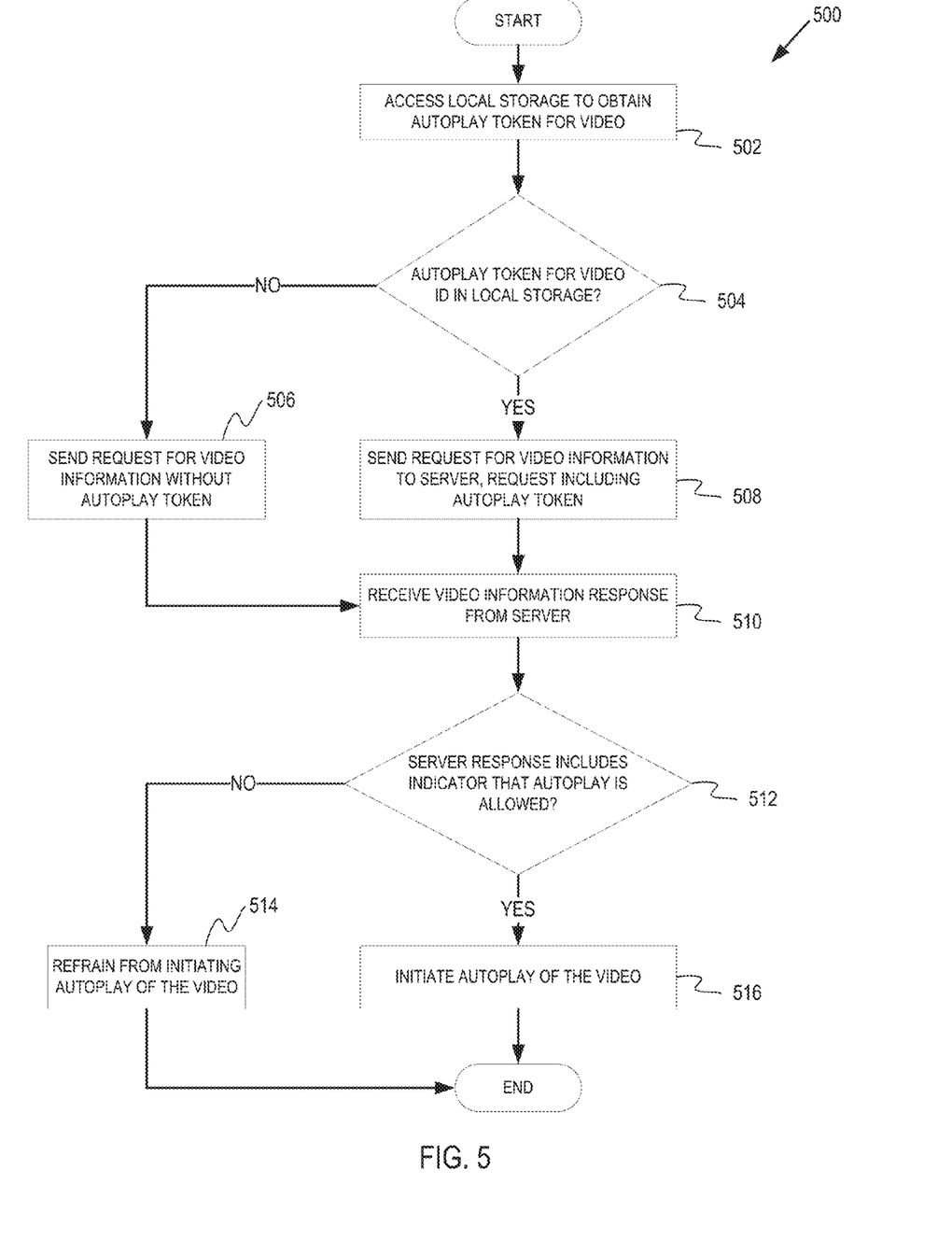
FIG. 5 is a flow diagram of another client-side method for facilitating monetization of videos embedded in third party content, in accordance with some aspects of the present disclosure.

FIGS. 4 and 5 are flow diagrams of client-side methods for facilitating monetization of videos embedded in third party content, in accordance with various aspects of the present disclosure. The methods may be performed by processing logic that comprises hardware (e.g., circuitry, dedicated logic, programmable logic, microcode, etc.), software (e.g., instructions run on a processing device to perform hardware simulation), or a combination thereof. For example, the methods may be performed by client device 110 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Additionally, it should be appreciated that the methods disclosed in this specification are capable of being stored on an article of manufacture to facilitate transporting and transferring such methods to computing devices. The term "article of manufacture," as used herein, is intended to encompass a computer program, including a set of instructions, accessible from any non-transitory, tangible computer-readable device or storage medium.

Referring to FIG. 4, at block 402, the client device presents a user interface of a third party platform. The user interface includes an embedded iframe that displays a thumbnail image of a video hosted by the CSP. In some implementations, thumbnail images of multiple videos can be displayed in the user interface.

The embedded iframe can detect user interaction with the thumbnail image of the video (e.g., user clicking or tapping on the thumbnail image), which indicates a user intent to watch the video. At block 406, the client device sends an indication of the user intent to watch the video to the CSP. In some implementations, in response to the user interaction with the thumbnail image of the video, a request for video related data (e.g., a request for an autoplay token) associated with the video is generated, as discussed above. The client device then sends this request to the CSP as an indication of the user intent to watch the video.

At block 408, the client device receives the video related data (e.g., autoplay token) associated with the video from the CSP. At block 410, the client device stores the video related data (e.g., autoplay token) associated with the video in local storage.

Referring to FIG. 5, at block 502, a video player is loaded in a user interface of a third party platform to autoplay a video hosted by the CSP, and the video player or another application on the client device accesses local storage to obtain an autoplay token associated with the video. If the autoplay token for the video is present in the local storage (block 504), the video player sends a request for video information with the autoplay token to the CSP (block 508). If the autoplay token for the video is not present in the local storage (block 504), the video player sends a request for video information without an autoplay token to the CSP (block 506).

At block 510, the video player receives a video information response from the CSP. If the video information response indicates that autoplay of the video is allowed (block 512), the video player starts automatic playback of the video in the UI provided by the third party platform (block 516). If the video information response does not indicate that autoplay of the video is allowed (block 512), the video player refrains from initiating automatic playback of the video (block 514).

Figure 6:
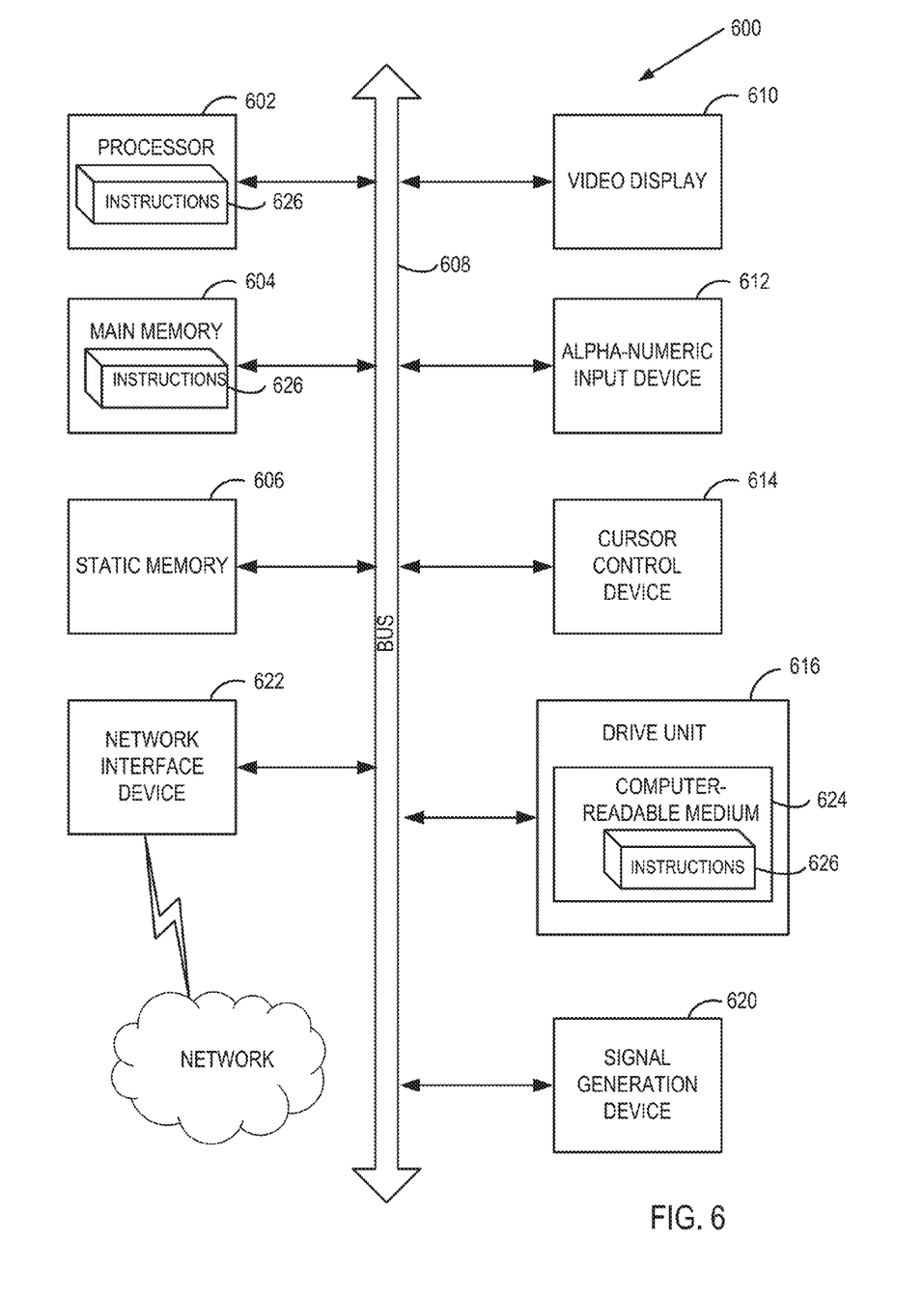
FIG. 6 is a block diagram of an example computer system that may perform one or more of the operations described herein, in accordance with various implementations.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device (disk drive) 616, which communicate with each other via a bus 608. Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network via the network interface device 622.

While the computer-readable storage medium 624 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    detecting, via an iframe embedded in a user interface of a third party platform, an indication of a user intent to view a video configured for automated playback, the video hosted by a content sharing platform and embedded in the user interface of the third party platform;
    providing, to a client device, video related data pertaining to the automated playback of the video in the user interface of the third party platform;
    upon receiving the video-related data, validating, by a processing device, the automated playback of the video in the user interface of the third party platform; and
    upon validating the automated playback of the video in the user interface of the third party platform, incrementing a view count for the video.

2. The method of claim 1 further comprising:
    sending a message indicating that the automated playback of the video in the user interface of the third party service is authorized.

3. The method of claim 1 further comprising:
    providing one or more ads to be presented with the video.

4. The method of claim 1 wherein the video-related data pertaining to the automated playback of the video in the user interface of the third party platform is a token that is valid for a predefined period of time.

5. The method of claim 4 wherein the token comprises one or more of a video identifier of the video, a third party platform service location identifier, a timestamp, or dimensions of a user interaction target area defined by the iframe.

6. The method of claim 1 wherein validating the automated playback of the video in the user interface of the third party platform comprises:
    determining, based on a timestamp of the video-related data, that the received video related data has not yet expired.

7. A client device comprising:
    a memory; and
    a processing device, coupled to the memory, to:
    present a user interface of a third party platform, the user interface having an embedded iframe to display a graphical representation of a video embedded in the user interface of the third party platform, the video configured for automated playback in the user interface of the third party platform;
    provide, to a server, a request for video related data pertaining to the automated playback of the video in the user interface of the third party platform;
    receive, from the server, the video related data pertaining to the automated playback of the video in the user interface of the third party platform;
    store the received video related data in local storage for subsequent validation to enable the automated playback of the video in the user interface of the third party platform; and
    prior to initiating the automated playback of the video in the user interface of the third party platform, access the local storage to determine whether the local storage includes the video related data for the video.

8. The client device of claim 7 wherein the processing device is further to:
    responsive to determining that the local storage includes the video related data for the video, send a request for video information data to the server, the request including the video related data for the video;
    receive a video information response from the server, the video information response indicating that the video related data is valid; and
    initiate the automated playback of the video in the user interface of the third party platform.

9. The client device of claim 8, wherein the processing device is further to:
    receive an ad for presentation with the video; and
    present the ad in the user interface of the third party platform.

10. The client device of claim 7 wherein the video-related data pertaining to the automated playback of the video in the user interface of the third party platform is a token that is valid for a predefined period of time.

11. The client device of claim 10 wherein the token comprises one or more of a video identifier of the video, a third party platform service location identifier, a timestamp, or dimensions of a user interaction target area defined by the iframe.

12. A non-transitory computer-readable storage medium storing instructions that, when executed by a processing device, cause the processing device to perform operations comprising:
    detecting, via an iframe embedded in a user interface of a third party platform, an indication of a user intent to view a video configured for automated playback, the video hosted by a content sharing platform and embedded in the user interface of the third party platform;
    providing, to a client device, video related data pertaining to the automated playback of the video in the user interface of the third party platform;
    upon receiving the video-related data, validating, by the processing device, the automated playback of the video in the user interface of the third party platform; and
    upon validating the automated playback of the video in the user interface of the third party platform, incrementing a view count for the video.

13. The computer-readable storage medium of claim 12 wherein the operations further comprise:
    sending a message indicating that the automated playback of the video in the user interface of the third party service is authorized.

14. The computer-readable storage medium of claim 13 wherein the operations further comprise:
    providing one or more ads to be presented with the video.

15. The computer-readable storage medium of claim 12 wherein the video-related data pertaining to the automated playback of the video in the user interface of the third party platform is a token that is valid for a predefined period of time.

16. The computer-readable storage medium of claim 15 wherein the token comprises one or more of a video identifier of the video, a third party platform service location identifier, a timestamp, or dimensions of a user interaction target area defined by the iframe.

17. The computer-readable storage medium of claim 12 wherein validating the automated playback of the video in the user interface of the third party platform comprises:

determining, based on a timestamp of the video-related data, that the received video related data has not yet expired.

\* \* \* \* \*